REVOLVER CIRCUIT WITH START-STOP MEANS

Original Filed Nov. 27, 1963 2 Sheets-Sheet 1

REVOLVER CIRCUIT WITH START-STOP MEANS

Original Filed Nov. 27, 1963 2 Sheets-Sheet 2

United States Patent Office

Re. 26,867
Reissued April 28, 1970

26,867

REVOLVER CIRCUIT WITH START-STOP MEANS

David B. G. Edwards, Gatley, and Tom Kilburn, Urmston, England, assignors to International Business Machines Corporation, Armonk, N.Y., a corporation of New York Original No. 3,325,797, dated June 13, 1967, Ser. No. 326,600, Nov. 27, 1963, which is a continuation-in-part of application Ser. No. 785,409, Jan. 7, 1959. Application for reissue June 10, 1969, Ser. No. 848,367
Claims priority, application Great Britain, Jan. 14, 1958, 1,307/58
Int. Cl. G11b *5/46, 15/12*
U.S. Cl. 340—174.1 10 Claims

Matter enclosed in heavy brackets [ ] appears in the original patent but forms no part of this reissue specification; matter printed in italics indicates the additions made by reissue.

*ABSTRACT OF THE DISCLOSURE*

*Apparatus for recording information on a magnetic medium undergoing relative displacement with respect both to a sensing transducer and a recording transducer which are spaced a fixed distance apart. Information is gated to the recording transducer with previously recorded information is adjacent to the sensing transducer thereby insuring uniform information spacing. Relative motion is halted whenever there is no information to be recorded and resumed when the information is available without disturbing the uniform information spacing. A unique checking system is also employed to determine the accuracy of the recorded information.*

*Brief background of the invention*

This invention relates to magnetic recording systems and more particularly to such systems for recording information in digital form. This is a continuation-in-part application of our co-pending application Ser. No. 785,409, filed Jan. 7, 1959, now abandoned.

It is well known that in magnetic recording systems digital information may be stored on a magnetic medium such as a magnetic tape or drum, for example, by polarizing the medium in response to electrical signals applied to a writing head coil so as to form a magnetic pattern on the medium representing the electrical signals.

This recording is performed by applying signals to the writing head during relative displacement between the head and the medium. The frequency of distribution, that is, the spacing of recorded elements of information, is thus dependent on the rate of relative displacement between the medium and the writing head. For this reason it is necessary to maintain the rate of relative displacement substantially constant and recording can only be carried out when this rate is attained. Hence, when it is required to start and stop recording, time must be allowed to attain or reduce the desired rate and this involves a wastage of space on the recording medium.

One object of the present invention is to reduce the above difficulties by providing a system of recording on a magnetic medium wherein the digit spacing on the medium is independent of the rate of relative displacement between the medium and the writing head.

According to the present invention there is provided apparatus for recording information on a magnetic medium undergoing relative displacement with respect to a recording means, comprising recording means, means for applying to said recording means a first electrical signal representing an element of information to record said element of information on said medium, means for generating from the record element so made a second electrical signal representing said record element, said recording means and said generating means having a predetermined spacing from one another in the direction of relative displacement, and means for gating to said recording means in response to and coincidentally with said second electrical signal a third electrical signal representing an element of information, whereby the spacing of the record elements on said medium resulting from said first and third electrical signals is dependent only on the spacing of said recording means and said generating means.

It will be seen from the above that in order to obtain predetermined spacing of recorded elements a signal for recording must be available, in effect, "substantially at the time of" reading the previously recorded element. It is found preferable, since for among other reasons this may not always be the case, to stop the relative displacement between the recording means and the magnetic medium. *This can be done* "substantially at the time of" reading and [to start] the relative displacement *can be started* again "substantially at the time of" writing. Thus in the case when a signal for recording is not available when first required, the predetermined spacing of recorded elements is still maintained. Clearly in the usual case where a signal for recording is available when first required, the rate of relative displacement is not materially affected since in effect stopping and starting occur simultaneously. It will be seen hereinafter that the above expressions "substantially at the time of" are used since stopping and starting do not occur exactly at the times stated but so near in time as compared to the rate of relative displacement as to be effective at those times.

Since signals are produced representing elements of information actually recorded, the invention affords an opportunity of checking recorded information element by element as it is recorded so that any errors may be readily distinguished and/or corrected.

In accordance with an additional aspect of the invention there is provided apparatus wherein said gating means has two operative conditions in which said third electrical signal may represent either the same element of information as said first electrical signal or a further element of information, and further comprising comparison means for comparing said first and second electrical signals to determine the operative condition of said gating means, whereby said third electrical signal represents the same element of information as said first electrical signal or a further element of information according to whether the first and second electrical signals represents different elements of information or the same element of information.

In a preferred feature of this latter aspect of the invention further recording and generating means are provided, said comparison means being responsive to electrical signals applied to both of said recording means and derived from both of said generating means and said further recording means being responsive to said comparison means, whereby said further recording means may record an element of information denoting the correctness or not of the recording of the preceding elements of information.

This latter aspect of the invention is particularly useful in multi-track recording in which case any one of the several digits recorded at any time may be incorrect.

Clearly a clock pulse track may also be recorded in synchronism with the recording of the other information by use of the present invention and such recording is accordingly independent of the relative rate of displacement of the magnetic medium.

Other features of the invention and those described above will become readily apparent from the following description of the computer magnetic tape output system with reference to the accompanying drawings, in which.

Figure 1:
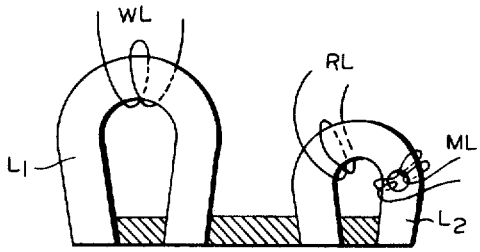
FIGURE 1 illustrates one example of a writing-reading head of the kind employed in carrying out the present invention.

In FIGURE 1, $W_L$ represents a writing coil wound on a core $L_1$ having a small gap of about 0.003 inch. The reading portion of the head is of the static type and comprises an output coil $R_L$ and a further coil $M_L$ wound on a common core $L_2$ having a gap of about 0.002 inch, the gaps in the cores $L_1$ and $L_2$ being in the same direction and alignment and being spaced one from the other, center to center, by about 0.01 inch.

The gaps in and between the cores are retained by brass spacers while the cores themselves are made of Permaloy C about 0.002 inch thick. It should be understood that this figure is intended to be only diagrammatical of the actual physical arrangement of the windings $R_L$ and $M_L$.

The writing pulses applied to the coil $W_L$ are of short duration compared with the time for a movement of 0.005 inch of any point of the recording medium, magnetic tape in this case, say, relative to the head at normal tape speeds, for example 10 to 20 inches/sec., so that the digit length is not significantly increased by the tape movement.

An alternating current of a frequency which is high compared to that at which digits are read from the tape at normal tape speeds is applied to the coil $M_L$ so that any polarization on the tape representing a digit causes modulation of the alternating current applied to the coil $M_L$ and provides thereafter read-out from the coil $R_L$. Thus the highest tape speed is limited only by the number of cycles of alternating current which occur while a recorded digit passes the gap in the core $L_2$. There is no lower limit for tape speed and the static head permits information to be read with an amplitude of signal independent of rate of relative displacement over a wide speed range including zero.

In the operation of the present invention a digit is recorded by the coil $W_L$ and then approaches the reading coils to give rise to an output signal representing that digit. This output may be employed to record a "clock" pulse digit on a further track on the medium in synchronism with the recording of the succeeding information digit and may be examined to ensure that the information has been correctly recorded. Circuit arrangements for these purposes may be of conventional design and are not peculiar to the present invention.

Figure 2:
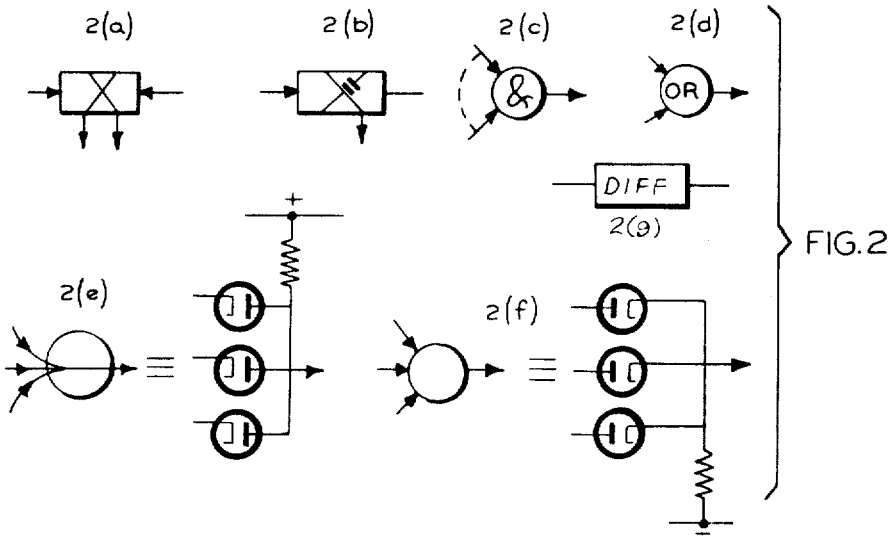
FIGURE 2 illustrates some of the logical symbols of electrical components in the computer magnetic tape output system of the present invention.

FIGURE 2a represents a two-stable-state trigger circuit or so-called "flip-flop" which may be set to the ON, or "1," state by a negative input pulse to the left hand side and re-set to the OFF, or "0," state by a negative input pulse to the right hand side. The output signals are negative-going on the left hand output lead for the "1" state and negative-going on the right hand output lead for the "0" state.

FIGURE 2b represents a monostable flip flop which is set to "1," by a negative input and returns to "0" after an interval determined by the time constants of the circuit.

FIGURE 2c represents an AND gate which generates an output pulse only in response to simultaneous input pulses on each input lead.

FIGURE 2d represents an OR gate which generates an output pulse when at least one input pulse is applied to either input lead.

FIGURES 2e and 2f show the symbols employed to represent conventional OR and AND gates which generate a particular polarity output signal in response to any one or more input signals.

FIGURE 2g represents a differentiating circuit and may, in some cases, be considered to include a differentiating limiting arrangement (DIFF LIM) to cut out positive, or negative, "spikes," which ever is desired.

The above devices are well known and various circuit arrangements have been described in the art to perform their particular functions.

Figure 3:
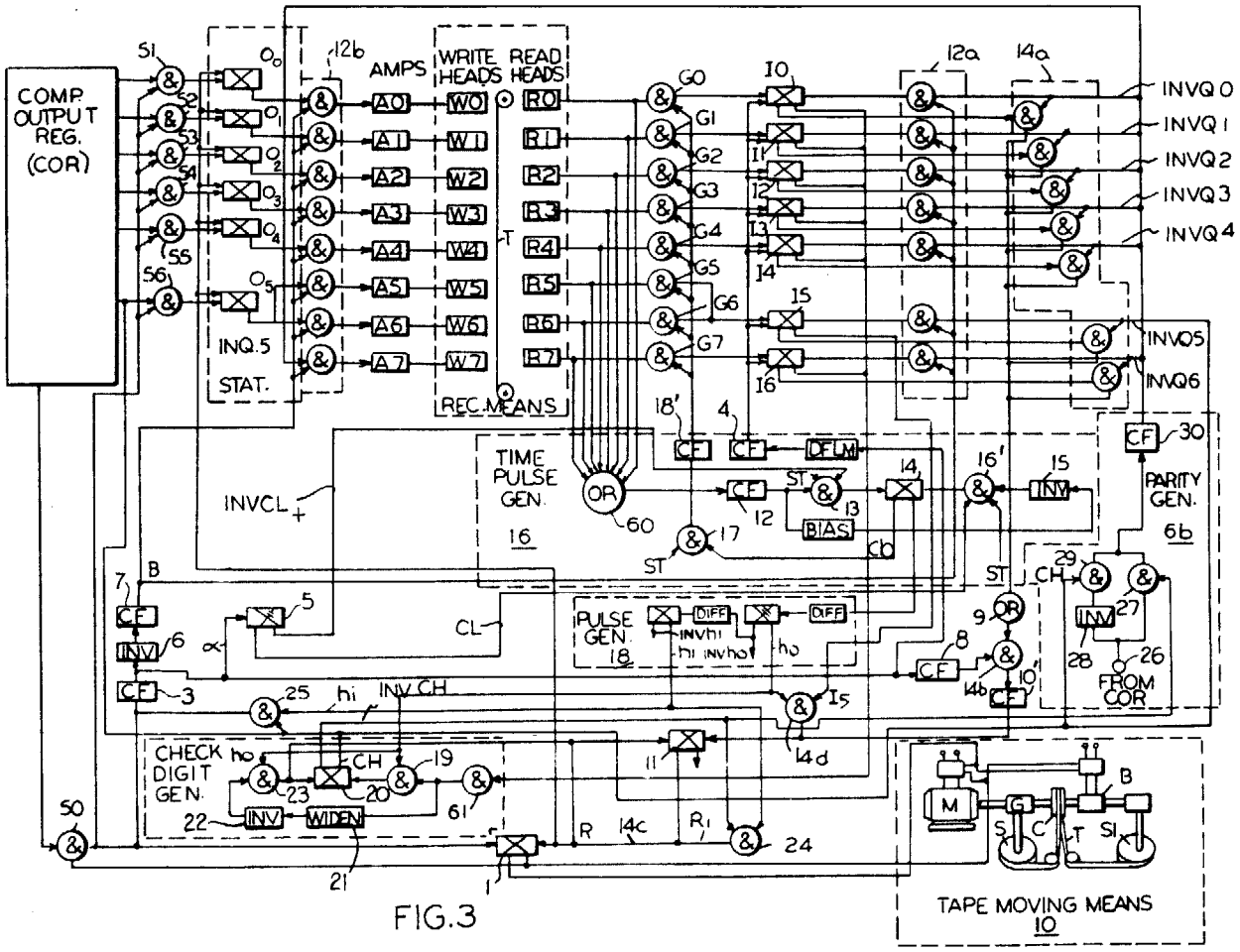
FIGURE 3 is a schematic circuit diagram of the computer magnetic tape output system including a multi-track magnetic tape recording system according to the invention.

FIGURE 3 illustrates the application of the invention to a magnetic tape output system for a computer producing information output signals representing five binary digits or so called "bits." The computer may be used for paper tape output and provides output instruction arrangements for paper tape punching operations.

The output instruction arrangement is that when the computer, during its sequence of operations, arrives at an instruction to print or punch out the five bits held in a particular register, this instruction is not executed immediately: the first action is to examine the state of a flip flop forming part of the output equipment which defines whether or not the output equipment is in a state to be used. For the present purpose this means that the driving arrangement of the tape output system is energized (not usable), or de-energized (usable). If the state of the flip flop indicates that the output system is "ready for use," then the next available pre-pulse in the computer is released, the output instruction is set up again and is properly executed this second time, the five bits in the aforementioned register being fed to the output system and recorded.

A precise understanding of the timing pulse and timing arrangements in the computer may not be important, suffice it to say that the simple operations occupy six 10 microsecond intervals so that timing pulses are normally emitted at 60 microsecond intervals. In the case of operations which take longe than 60 microseconds to execute, however, it can be assumed that timing pulses are available for release at subsequent 60 microsecond intervals. Thus, if, when an output instruction is first set up, the output equipment is "ready for use," it can be assumed that the next timing pulse 60 microseconds after the preceding one is emitted to repeat the output instruction for a second time. If the output equipment is "not ready for use," the state of the appropriate flip flop inhibits timing pulses until reset, when the next timing pulse available is released, at a time which in general is something less than 60 microseconds after resetting of the flip flop.

Counting of the number of times the output instruction is used, whether once or twice, is carried out by a two state counter forming part of the computer. When an output instruction is set up the first time, this counter is set to the "1" state. When the instruction is obeyed for the second and last time, this counter is reset to the "0" state.

The tape T is controlled by a capstan C which is driven by motor M through a gearbox G from which a drive is also taken to the tape spools S and $S_1$. A brake B is also provided for stopping the capstan. Motor M and brake B are controlled by a flip flop 1 which initiates starting of the tape driving mechanism 10 when in its "1" state and stopping of the tape driving mechanism when in its "0" state. The state of the computer output equipment is thus defined by the state of the flip flop 1 and is deemed to be "not ready for use" if the flip-flop 1 is not in the condition to stop the tape, and, conversely, the equipment is "ready for use" if the flip flop 1 is in the condition to stop the tape. It should be understood that operation of the flip flop 1 and of the tape drive brake B merely indicates that the last operation was successfully executed and will normally be immediately reversed by the next timing pulse so that in general it does not have any noticeable effect upon the tape motion except at the end of the writing of a block of information.

If the flip flop 1 is set to the STOP position, so that the tape equipment is "ready for use" the output instruction is repeated and the tape staticisors 12 are set. A so-called parity digit or signal INV $Q_6$ is derived from cathode follower 30 of the magnetic recording system of FIGURE 3 responsive to a signal from the computer applied to terminal 26 and the significance of this digit will be described hereinafter. At a slightly later interval than the interval of the parity digit, a 10 microsecond pulse is applied to the terminal 2 to reverse flip flop 1 and so start the tape moving, and it also provides the $\alpha$ waveform via a cathode follower 3. The negative pulse of the differentiated $\alpha$ waveform is applied via a cathode follower 4 to reset the staticisors $I_0$ to $I_6$ to a predetermined state, in this case the "1" state, and also initiates the generation of the inverted clamp waveform CL from a monostable flip flop 5, which waveform is approximately 300 microseconds long.

The inverted $\alpha$ waveform denoted as the $\beta$ waveform is generated from the output $\alpha$ waveform of cathode follower 3 being applied to inverter 6 and cathode follower 7, and together with the information input signal INV $Q_0$ to $Q_6$ sets the $I_0$ to $I_6$ staticisors to states representing this information to be recorded, by way of a positive trigger pulse from AND gates 12a for each of the cases where the appropriate INV Q signal represents a particular binary digit, here a "1." At the same time the $\alpha$ waveform gates the same information as positive pulses for a "1" to the write amplifiers $A_0$ to $A_7$ via AND gates 12b so that it is recorded on the magnetic tape by means of the writing heads $W_0$ to $W_7$. The five bits of output information INV $Q_1$–$Q_5$ and the parity digit INV $Q_6$ from the computer output register COR are staticised on flip flops $O_0$ to $O_5$ when the flip flop 1 is in the "0" state by a timing pulse which is gated through AND gate 50 and applied to AND gates 51 to 56 to provide the information signals denoted by INV $Q_0$ to INV $Q_4$ and INV $Q_6$ which are applied to amplifiers $A_0$ to $A_4$ and $A_7$ and staticisors $I_0$ to $I_4$ and $I_6$, respectively. INV $Q_5$ represents a check digit and is applied to both amplifiers $A_5$ and $A_6$, and staticisor $I_5$, as shown.

As a partial check on the correct setting of the $I_0$ to $I_6$ staticisors, the back edge of the $\alpha$ waveform, as a positive pulse from a cathode follower 8, is used to examine the combined outputs of the I staticisors and the information signals INV $Q_0$ to INV $Q_6$ which are applied in corresponding pairs to individual AND gates 14a as shown, output signals from these gates being applied to an OR gate 9. An output signal from gate 9 is applied together with the aforementioned positive pulse from cathode follower 8 in an AND gate 14b to a cathode follower 10'. If there is a non-check, which is to say if there is a signal from any one of the AND gates 14a feeding OR gate 9, indicating that one of the I signals does not properly correspond to the respective INV Q signal, the flip flop 11 is set by a positive output from cathode follower 10'. The flip flop 11, if set, does no more than operate some warning device and inhibit further operation of the equipment 10 by applying a signal to reset flip flop 1 to the stop position via lead 14c. It will be seen that this is only a partial check of the initial setting of the I staticisors since there is a possibility of failure to reset the staticisors at an earlier stage.

The flip flop 11 is also triggered by the $I_5$ staticisor output and an $h_o$ pulse via an AND gate 14d in the event of failure to read both check tracks. The derivation and further use of the $h_o$ pulse is described below as being generated from the clock waveform when it is necessary to start checking the information read from the tape.

Some time after the writing operation the clamp waveform CL from delay flop 5 terminates and after this, due to the tape movement, the recorded digits on the tape appear under the reading portions $R_0$ to $R_7$ of the writing-reading heads. The consequent read output signals $r_0$ to $r_7$ (normally biased positive) are mixed together, in an OR gate 60 of a time pulse generator 16 and applied to cathode follower 12 to produce the clock waveform CLO which is composed of all signals read from the tape. These signals are gated through AND gate 13 by the strobe waveform ST and positively biased inverted clamp waveform denoted as INV $CL_+$ to set a flip flop 14. The strobe waveform ST is merely a "read modulation frequency pulse waveform" to select the correct phase and determine whether or not there is something written on the tape. The reset side of flip flop 14 is fed by a biased clock waveform CLO via an inverter 15 and AND gate 16' which gate is under the control of the strobe waveform ST and the clamp waveform CL so that flip flop 14 is reset immediately a signal is ready. The left-hand side (set) of flip flop 14 receives no signal until a correctly phased signal is detected. As the signals from the reading heads build up, the strobe waveform on the reset side is cut off and the input signal to the set side is gated to the flip flop. The resulting output from flip flop 14 is a square clock waveform CLO approximating to the envelope of the signals from the reading heads $R_0$ to $R_7$. When this waveform CLO terminates, showing that the tape has moved on, the back edge of the inverse clock waveform INV CLO is employed to initiate the generation of the $h_0$ and $h_1$ pulses (each of about 10 microseconds duration) as is shown in the pulse generator 18.

The read output signals $r_0$ to $r_7$ are also gated as negative trigger pulses through AND gates $G_0$ to $G_7$, respectively, by the strobe waveform ST and clock waveform CLO, applied via an AND gate 17 and cathode follower 18', so as to set the I staticisors, as shown. It will be seen that the read output signals $r_5$ and $r_6$, derived from digits recorded in response to the check information signal INV $Q_5$, are both gated to staticisor $I_5$, and the double recording of the check digit is merely a safety measure to ensure at least one correct check read output signal being obtained.

The outputs of the I staticisors are compared or mixed in an AND gate 61 and gated by pulse $h_o$ through AND gate 19 to the set input of a flip flop 20 as shown in a check digit generator 62. If the information was correctly recorded, then, on setting, all of the I staticisor outputs become positive and there is therefore no signal output from AND gate 19 to set the flip flop 20, and, because of the further output connection from AND gate 61 through widening circuit 21, inverter 22 and AND gate 23, also opened by pulse $h_o$, flip flop 20 is reset during $h_o$. If the information was incorrectly recorded and there is a non-check, one or more of the I staticisor outputs will be negative and will result in the flip flop 20 being set during $h_o$, the resetting by $h_o$ through AND gate 23 being inhibited. The flip flop 20 will thus remain set until the next $h_o$ pulse which occurs without an error of recording. The outputs of the flip flop 20 for non-check are CH (negative), and INV CH (positive), and vice-versa for check, the CH output being applied to the appropriate computer output staticisor to provide information signal INV $Q_5$ in the following recording interval.

If flip flop 20 indicates a check, the following $h_1$ pulse is gated through AND gate 24 by a control input INV CH to reset the magnetic tape control flip flop 1 of FIGURE 3a to the stop position so that the sequence of operations corresponding to the next instruction in the computer may proceed. If, however, flip flop 20 indicates a non-check, new $\alpha$ and $\beta$ waveforms (not arising in response to the computer) are generated by the $h_1$ pulse via AND gate 25 under the control of an input CH and the whole sequence of events will be repeated to re-record the previously incorrectly recorded information.

Flip flops 1, 11 and 20 may be reset via the leads R from a reset key (not shown).

The parity information signal INV $Q_6$ is arranged, for the case of correctly recorded information, to be a "1" if the parity count of the information signals INV $Q_0$ to INV $Q_5$ is even, and "0" if this count is odd. If the information is wrongly recorded this principle is reversed.

Thus, since one criterion for the parity signal is correctness of recording, the parity signal in one digit interval depends on preceding signals, as does the check information signal INV $Q_5$.

In generating the parity signal INV $Q_6$, an input signal from the computer is applied to terminal 26 of a parity digit generator 66 to be positive for an even parity count and negative for an odd parity count in the case of correct recording, as just described. This input signal is applied to AND gate 27 together with another input signal INV CH and also via an inverter 28 to AND gate 29 having another input signal CH, as shown. The two AND gates 27 and 29 are connected to a cathode follower 30 arranged to generate INV $Q_6$ as a "1" in response to an output from either gate. This arrangement enables the significance of INV $Q_6$ to be reversed for the case of incorrect recording to ensure that there are always at least two digits across the tape to provide the clock waveform CLO.

The parity digit is employed when reading a tape recorded by the apparatus described above to determine correctness of reading since it will be seen that a parity count of read outputs corresponding to $r_0$ to $r_4$ and $r_6$ must be even for correct reading and an odd indication signifies a reading failure and necessity for maintenance.

In the above described output system "0's" are recorded by "no action" signals so that they can always be written on the tape. Thus the magnetic tape can be demagnetized before use so that any missing or defunct areas of magnetic oxide surface on the tape will be similar to demagnetized areas and represent a "0" leading to incorrect recording and consequent re-recording, or correct recording, as the case may be.

A study of failures to read or record with magnetic tape shows that they are almost entirely due to movement of tape away from the head because of dust or "clumps" of oxide, whereas apparent "pinholes" in tapes or areas of bad oxide seem to be virtually non-existent and would in any case have to compare in size with a digit area to give rise to similar signals. Thus, it may be possible to saturate the tape in the "0" direction for "0" indication and polarize the tape in the other direction when recording a "1." This mode of operation results in larger signals from the read heads, but absence of oxide will then tend to give rise to a "1" signal.

In the above described system two check tracks are provided and their outputs are compared on reading so that failure of both tracks at the same digit position is required before actual failure is indicated. Failure in both check tracks stops the system and the operator must repeat the recording of that block from the start.

The only other occasion giving rise to failure of the equipment is the case in which the previous information was supposed to be 0 and it was incorrectly recorded. This then gives rise to information as o together with check and parity signals as "0's" and in this case the tape will spill out of the output device as no clock waveform CLO would be detected.

We claim:

1. Apparatus for recording information on a magnetic medium undergoing relative displacement with respect to a recording means, comprising recording means, means for applying to said recording means a first electrical signal representing an element of information to record said element of information on said medium, means for generating from the first electrical signal applied on the recording means a second electrical signal representing said element, said recording means and said generating means having a predetermined spacing from one another along the magnetic medium in the direction of relative displacement, means for gating to said recording means in response to and coincidentally with said second electrical signal a third electrical signal representing a further element of information, means operable coincidentally with said first and third electrical signals for initiating starting of relative displacement between the magnetic medium and said recording means, and means responsive to said second electrical signal for initiating stopping of such relative displacement, whereby the spacing of the record elements on said medium resulting from said first and third electrical signals is dependent only on the spacing of said recording means and said generating means.

2. Apparatus according to claim 1 wherein said gating means has a first operative condition in which said third electrical signal represents the same element of information as said first electrical signal and a second operative condition in which said third electrical signal represents a further element of information comprising comparison means for comparing said first and second electrical signals to determine the operative condition of said gating means, whereby said gating means adopts said first operative condition when said first and second electrical signals represent different elements of information and said second operative condition when the latter signals represent the same element of information.

3. Apparatus according to claim 2 wherein said comparison means comprises a two-state device having initial predetermined state, said apparatus further comprising means for applying said first electrical signal to said device to set said device to a state corresponding to said first electrical signal, and means for applying said second electrical signal to said device to set said device to a state corresponding to said second electrical signal.

4. Apparatus according to claim 3 comprising further recording and generating means in similar arrangement to the first-mentioned such means, said comparison means being responsive to electrical signals applied to both said recording means and derived from both of said generating means, and means for applying an electrical signal to said further recording means representing the operative condition of said gating means, whereby said further recording means may record an element of information denoting the correctness or not of the recording of the preceding elements of information.

5. Apparatus according to claim 1 comprising further recording means for recording a timing signal in response to and coincidentally with said second electrical signal.

6. Apparatus according to claim 1 comprising means for starting the relative displacement between said recording means and said magnetic medium, means for stopping said relative displacement, means responsive to said first and third electrical signals for initiating operation of said starting means, and means responsive to said second electrical signal for initiating operation of said stopping means, whereby in the case where said third electrical signal is not available coincidentally with said second electrical signal said predetermined spacing of recorded elements on said medium is maintained.

7. Apparatus for recording information on a magnetic medium undergoing relative displacement with respect to a plurality of recording means, comprising a plurality of recording means each associated with different paths on said medium, means for simultaneously applying individual first electrical signals representing elements of information to said recording means to record said elements of information on said medium, a plurality of means each associated with different ones of said recording means for simultaneously generating from the record elements so made second electrical signals representing said record elements, associated ones of said recording means and said generating means having a predetermined spacing in the direction of the path on said medium associated therewith, means for simultaneously gating to said recording means individual third electrical signals representing elements of information, said gating means having one operative condition in which said third electrical signals represent the same elements of information as said first electrical signals and another operative condition in which said third electrical signals represent further elements of information, and comparison means for individually comparing associated ones of said first and second electrical signals to determine the operative condition of said gating means, the third electrical signal applied to one of said recording means representing the operative condition of said gating means.

*8. Apparatus for recording information on a magnetic medium undergoing relative displacement with respect to a recording means, comprising recording means, means for applying to said recording means a first electrical signal representing an element of information to record said element of information on said medium, means for generating from the first electrical signal applied on the recording means a second electrical signal representing said element, said recording means and said generating means having a predetermined spacing from one another along the magnetic medium in the direction of relative displacement, means for gating to said recording means in response to said second electrical signal a third electrical signal representing a further element of information, means for initiating starting of relative displacement between the magnetic medium and said recording means and means operative intermediate the application to said recording means of said first electrical signal and the gating to said recording means of said third electrical signal for initiating stopping of such relative displacement, whereby the spacing of the record elements on said medium resulting from said first and third electrical signals is dependent on the spacing of said recording means and said generating means.*

*9. Apparatus according to claim 8, comprising means for starting the relative displacement between said recording means and said magnetic medium, means for stopping said relative displacement, means responsive to said first and third electrical signals for initiating operation of said starting means, said means for initiating stopping initiating operation of said stopping means, whereby when said third electrical signal is not available said predetermined spacing of recorded elements on said medium is maintained.*

*10. The method of recording information on a magnetic medium comprising the steps of:*

*initiating relative displacement between the medium and a recording means;*

*recording an element of information on the medium as it passes the recording means;*

*generating an electrical signal from the recorded element of information on the medium as it passes a generating means, said recording means and said generating means having a predetermined spacing from one another along the magnetic medium in the direction of relative displacement;*

*utilizing the generated electrical signal to gate the recording of a further element of information on the medium as it passes the recording means;*

*initiating stopping of such relative displacement intermediate the recording of said element of information and the recording of said further element of information;*

*repeating the foregoing steps to provide a series of recorded element of information on the media at spaced intervals dependent upon said predetermined spacing of said recording means and said generating means.*

References Cited

The following references, cited by the Examiner, are of record in the patented file of this patent or the original patent.

UNITED STATES PATENTS

| | | | |
|---|---|---|---|
| 3,267,448 | 8/1966 | Gunther | 340—174.1 |
| 2,739,299 | 3/1956 | Burkhart | 340—174.1 |
| 3,828,454 | 4/1962 | Von Kohorn | 179—100.2 |

JAMES W. MOFFITT, Primary Examiner

V. P. CANNEY, Assistant Examiner

U.S. Cl. X.R.

179—100.2